United States Patent
Kostorz

(10) Patent No.: US 11,987,964 B2
(45) Date of Patent: May 21, 2024

(54) SANITARY FAUCET HAVING A NON-AXIAL THERMOSTATIC MIXING VALVE AND METHOD FOR INSTALLING A SANITARY FAUCET

(71) Applicant: Grohe AG, Hemer (DE)

(72) Inventor: Ole Benedikt Kostorz, Menden (DE)

(73) Assignee: GROHE AG, Hemer (DE)

( * ) Notice: Subject to any disclaimer, the term of this patent is extended or adjusted under 35 U.S.C. 154(b) by 128 days.

(21) Appl. No.: 17/914,606

(22) PCT Filed: Feb. 19, 2021

(86) PCT No.: PCT/EP2021/054178
§ 371 (c)(1),
(2) Date: Sep. 26, 2022

(87) PCT Pub. No.: WO2021/190839
PCT Pub. Date: Sep. 30, 2021

(65) Prior Publication Data
US 2023/0107446 A1 Apr. 6, 2023

(30) Foreign Application Priority Data
Mar. 27, 2020 (DE) .......................... 102020108544.3

(51) Int. Cl.
*E03C 1/04* (2006.01)
*F16K 11/00* (2006.01)
(Continued)

(52) U.S. Cl.
CPC .......... *E03C 1/041* (2013.01); *F16K 11/0782* (2013.01); *F16K 19/006* (2013.01);
(Continued)

(58) Field of Classification Search
CPC .... E03C 1/041; F16K 11/0782; F16K 19/006; F16K 11/0787; G05D 23/1353; G05D 23/134
See application file for complete search history.

(56) References Cited

U.S. PATENT DOCUMENTS 4,669,653 A * 6/1987 Avelov ............... G05D 23/1353
236/12.13
5,129,576 A * 7/1992 Pullen .................. G05D 23/136
236/12.2
(Continued)

FOREIGN PATENT DOCUMENTS

DE 10 2009 007 538 8/2010
DE 11 2017 000 317 10/2018
(Continued)

OTHER PUBLICATIONS

International Search Report issued May 6, 2021, in International (PCT) Application No. PCT/EP2021/054178, with English translation.

*Primary Examiner* — Matthew W Jellett
*Assistant Examiner* — Christopher D Ballman
(74) *Attorney, Agent, or Firm* — Wenderoth, Lind & Ponack, L.L.P.

(57) ABSTRACT

A sanitary faucet having a faucet body; a mixing valve for mixing cold water and warm water to form a mixed water; and a thermostatic mixing valve for mixing cold and hot water to generate the warm water, containing an expansion material element and a gate valve operated by the expansion material element for adjusting a mixing ratio between the cold water and the hot water, wherein the expansion material element and the gate valve are arranged non-coaxially to each other, wherein the expansion material element can be used to operate the gate valve via a connection element, and wherein the connection element can be attached to the gate (Continued)

valve or the expansion material element and can subsequently be rotated into a closed position, in which the gate valve and the expansion material element are interconnected by the connection element. A method of installing a sanitary faucet is proposed.

10 Claims, 3 Drawing Sheets

(51) Int. Cl.
  *F16K 11/078* (2006.01)
  *G05D 23/13* (2006.01)
(52) U.S. Cl.
  CPC ...... *G05D 23/1353* (2013.01); *F16K 11/0787* (2013.01); *G05D 23/134* (2013.01)

(56) References Cited

U.S. PATENT DOCUMENTS

| | | | | |
|---|---|---|---|---|
| 5,462,224 A * | 10/1995 | Enoki | ................ | G05D 23/1353 236/12.13 |
| 5,904,291 A * | 5/1999 | Knapp | ................ | G05D 23/1346 137/88 |
| 6,257,493 B1 * | 7/2001 | Chamot | ................ | F16K 19/006 236/12.13 |
| 6,820,816 B1 * | 11/2004 | Reid | ................ | F16K 19/006 236/12.13 |
| 7,073,725 B2 * | 7/2006 | Swadling | ........... | G05D 23/1353 236/12.2 |
| 7,744,007 B2 * | 6/2010 | Beagen | ................ | G05D 23/134 236/12.12 |
| 8,074,893 B2 * | 12/2011 | Mace | ................ | G05D 23/1353 236/12.11 |
| 10,161,535 B2 * | 12/2018 | Sansum | ............ | G05D 23/1313 |
| 10,817,006 B2 * | 10/2020 | Fassolette | ................ | E03C 1/02 |
| 10,935,996 B2 * | 3/2021 | Ottelli | ................ | G05D 23/1313 |
| 11,003,199 B2 * | 5/2021 | Fassolette | .......... | G05D 23/1353 |
| 11,060,628 B2 * | 7/2021 | Pfund | ................ | F16K 27/003 |
| 2002/0100510 A1 * | 8/2002 | Otelli | ................ | F16K 27/045 137/625.17 |
| 2005/0173545 A1 * | 8/2005 | Strader | ................ | G05D 23/134 236/12.2 |
| 2019/0048565 A1 | 2/2019 | Fassolette et al. | | |

FOREIGN PATENT DOCUMENTS

| | | |
|---|---|---|
| FR | 3 050 251 | 10/2017 |
| KR | 10-2011-0065308 | 6/2011 |

* cited by examiner

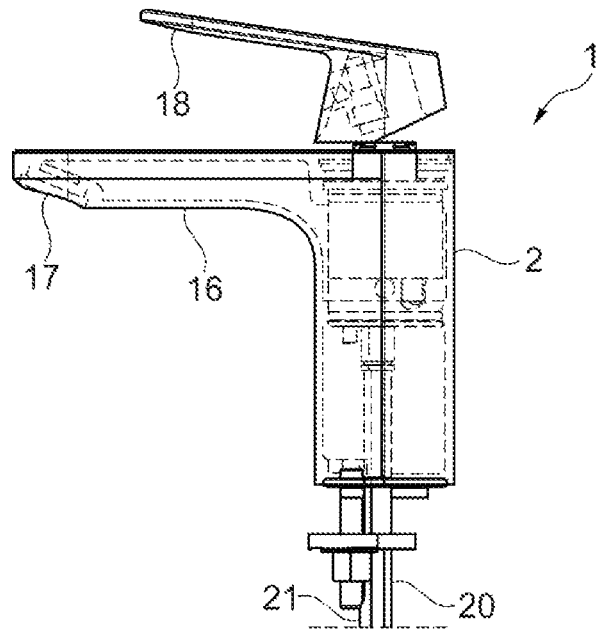
Fig. 1
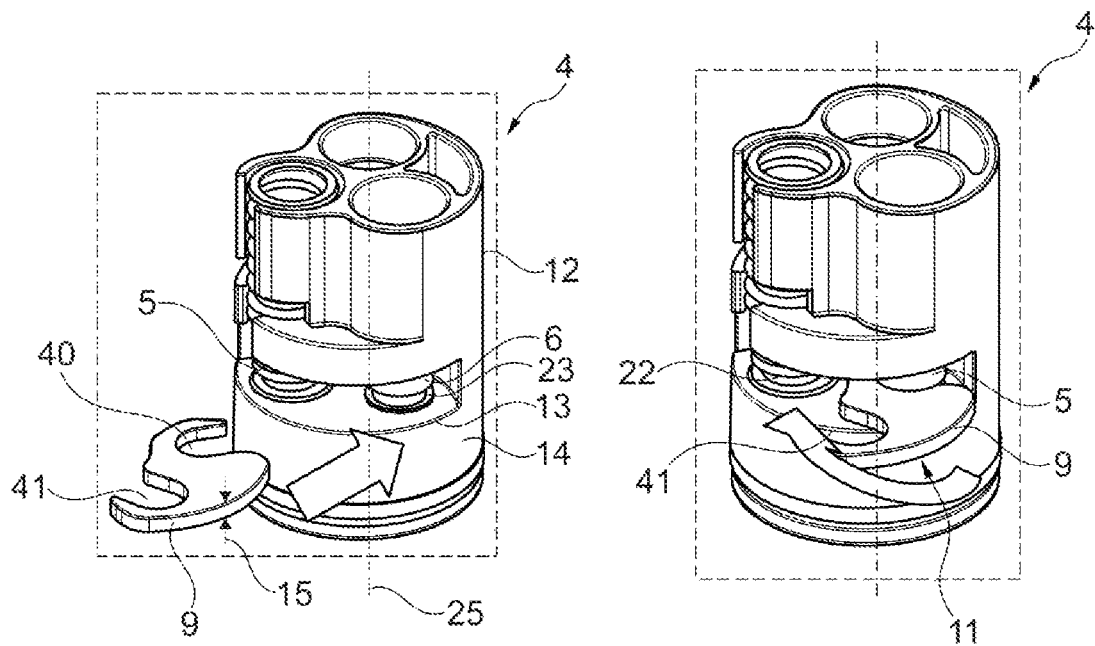
Fig. 3
Fig. 4

SANITARY FAUCET HAVING A NON-AXIAL THERMOSTATIC MIXING VALVE AND METHOD FOR INSTALLING A SANITARY FAUCET

This invention relates to a sanitary faucet and a method for installing a sanitary faucet, which can be used to mix cold water and hot water to form a mixed water having a desired mixed-water temperature. Such sanitary faucets can be used to provide the mixed water in particular at washbasins, sinks, showers and/or bathtubs.

Sanitary faucets can, for instance, be designed in the manner of a single-lever mixer, which have a (single) operating lever for setting the mixed-water temperature and a discharge quantity of the mixed water. The temperature of the hot water supplied to the single-lever mixer is often not constant but can be subject to fluctuations, for instance during the course of the day. As a result, even when the operating lever is in the same position, the mixed-water temperature of the mixed water produced by a mixing valve of the single-lever mixer fluctuates. A user of the sanitary faucet can therefore not rely on drawing mixed water at the desired mixed-water temperature when the operating lever is in a certain position, but frequently has to readjust the mixed-water temperature using the operating lever. In addition, it is disadvantageous that there is a risk of scalding when hot water of particularly high hot-water temperatures is supplied to the single-lever mixer. Even hot water at normal temperature can cause scalding. In addition, pressure fluctuations of the cold water or an outage of the supplied cold water can lead to hazards.

It is therefore already known to arrange a thermostatic mixing valve upstream of a warm-water inlet of the mixing valve of the sanitary faucet, which can be used to supply warm water of a predetermined warm-water temperature to the warm-water inlet of the mixing valve. For this purpose, the thermostatic mixing valve mixes the hot water and the cold water upstream to maintain a constant warm-water temperature. The hot water premixed in this way is then routed to the hot-water inlet of the mixing valve. The disadvantage of such thermostatic mixing valves is their large installation space, which is often not available in the faucet bodies of the sanitary faucets or which requires an increase in size of the faucet bodies of the sanitary faucets.

Therefore, the invention addresses the problem of solving at least part of the problems described with reference to the prior art and, in particular, of providing a sanitary faucet whose thermostatic mixing valve has smaller installation space requirements. In addition, a method by which a thermostatic mixing valve of the sanitary faucet having small installation space requirements can be manufactured is also to be specified.

These problems are solved by a sanitary faucet and a method for its installation having the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary faucet having at least the components listed below contributes to solving the problem:
 a faucet body;
 a mixing valve for mixing cold water and warm water to form a mixed water; and
 a thermostatic mixing valve for mixing cold water and hot water to generate the warm water, comprising an expansion material element and a gate valve that can be operated by the expansion material element for adjusting a mixing ratio between the cold water and the hot water, wherein the expansion material element and the gate valve are arranged non-coaxially to each other, wherein the expansion material element can be used to operate the gate valve via a connection element, and wherein the connection element can be attached to the gate valve or the expansion material element and can subsequently be rotated into a closed position, in which the gate valve and the expansion material element are interconnected by the connection element.

The sanitary faucet can be designed in particular in the manner of a single-lever mixer and/or used in particular to provide a mixed water at a washbasin, sink, shower and/or bathtub. Furthermore, the sanitary faucet has a faucet body. The faucet body can at least partially be made of plastic and/or metal, such as brass or a zinc alloy. Furthermore, the faucet body can be attached in particular to a support, such as a (kitchen) countertop.

In addition, the sanitary faucet has a mixing valve for mixing cold water and warm water to form a mixed water. The mixing valve can, for instance, be designed in the manner of a single-lever mixing cartridge and/or be disposed at least partially in the faucet body of the sanitary faucet. The mixing valve can have a mixing body, which in particular is at least partially made of plastic and/or is at least partially cylindrical in shape. In the mixing body, a control lever is at least partially movably mounted, which is used to actuate the mixing valve. For this purpose, the control lever is connected in particular to an operating lever of the sanitary faucet, for instance by means of a screw/bolted connection or plug-in connection.

The control lever can be rotated about an axis of rotation, in particular for setting a mixed-water temperature, and/or rotated about an axis of rotation (in particular extending orthogonally to the axis of rotation), in particular for setting a discharge quantity of the mixed water. Furthermore, the mixing valve can have a stationary control disk and a mobile control disk. The stationary control disk and the mobile control disk can each be flat or disk-shaped, in particular. Furthermore, the stationary control disk and the mobile control disk may at least be partially made of ceramic. The stationary control disk is in particular immovable, i.e. in particular not displaceable or non-rotatable relative to the body, disposed in the body, whereas the mobile control disk can be movable (in particular rotatable relative to the body) in particular by the control lever on the stationary control disk.

Furthermore, the sanitary faucet has a thermostatic mixing valve for mixing the cold water and the hot water to form the warm water. The cold water can be supplied to the thermostatic mixing valve, for instance from a public water supply network, in particular via a cold-water line and/or the hot water can be supplied to the thermostatic mixing valve, for instance from the public water supply network and/or a hot-water heater, in particular via a hot-water line. The cold-water line and/or the hot-water line may be, for instance, a pipe or a flexible hose. A cold-water temperature of the cold water is in particular at most 25° C. (Centigrade), preferably 1° C. to 25° C., particularly preferably 5° C. to 20° C. and/or a hot-water temperature of the hot water is in particular at most 100° C., preferably 25° C. to 100° C., particularly preferably 55° C. to 65° C. The cold water and hot water can be mixed to a warm water in particular in a warm-water mixing chamber of the thermostatic mixing valve. The thermostatic mixing valve comprises also an expansion material element and a gate valve that can be actuated by the expansion material element. The expansion material element extends in particular along a first longitudinal axis and/or is at least partially rotationally symmetrical about the at least one first longitudinal axis. Furthermore, the expansion material element may be at least partially made of a wax and/or may expand, in particular in parallel to the first longitudinal axis, as a function of the mixed-water temperature of the mixed water. The gate valve can be at least partially made of metal or plastic. Furthermore, the gate valve can in particular be at least partially cylindrical or tubular in shape. In addition, the gate valve may extend along a second longitudinal axis. The gate valve is connected to the expansion material element in such a way that a change in length of the expansion material element results in an actuation or a motion of the gate valve, in particular in the direction of its longitudinal axis. By actuating or moving the gate valve, a mixing ratio between the cold water and the hot water can be changed, in that way a warm-water temperature of the mixed warm water can be influenced by the thermostatic mixing valve. For this purpose, the gate valve can, in particular, change a gap width of a cold-water control gap and/or a gap width of a hot-water control gap of the thermostatic mixing valve. The cold water can be supplied to the warm-water mixing chamber of the thermostatic mixing valve, in particular via the cold-water control gap, and/or the hot water can be supplied to the warm-water mixing chamber of the thermostatic mixing valve, in particular via the hot-water control gap. The cold-water control gap and/or the hot-water control gap are formed in particular between the gate valve and a body of the thermostatic mixing valve or a cartridge adapter of the mixing valve. In particular, the actuation of the gate valve results in a simultaneous change in the gap width of the cold-water control gap and the hot-water control gap. An increase of the gap width of the cold-water control gap results in particular in a reduction in size of the hot-water control gap. Accordingly, a reduction of the gap width of the cold-water control gap results in particular in an increase in size of the hot-water control gap. Furthermore, an extension or lengthening of the expansion material element results in particular in an increase of the gap width of the cold-water control gap and a reduction of the gap width of the hot-water control gap. Accordingly, shrinking or shortening the expansion material element results in particular in a reduction of the gap width of the cold-water control gap and an increase of the gap width of the hot-water control gap. An increasing mixed-water temperature of the mixed water can thus result in a decreasing warm-water temperature of the warm water. Furthermore, a decreasing mixed-water temperature of the mixed water can thus result in an increasing warm-water temperature of the warm water. If the mixed-water temperature of the mixed water exceeds, for instance, a limit value the gate valve can close the hot-water control gap completely. The warm-water temperature of the warm water is then equal to the cold-water temperature of the cold water. In other words, the warm water in this case consists exclusively of the cold water. The warm-water temperature of the warm water can be for instance, 1° C. to 60° C. The warm water mixed by the thermostatic mixing valve can then be routed to the mixing valve, by which the warm water can be mixed with (further) cold water to form the mixed water. The expansion material element and the gate valve are not arranged coaxially to each other. In particular, this can mean that the first longitudinal axis of the expansion material element and the second longitudinal axis of the gate valve are not interaligned. Furthermore, this can mean that the expansion material element and the gate valve are not arranged axially or are not arranged in succession in the direction of their longitudinal axes. This results in a smaller installation space requirement for the thermostatic mixing valve. This allows the thermostatic mixing valve to be arranged in the faucet body, for instance in a cylindrical free space and/or below the mixing valve.

A connection element is used to actuate the gate valve via the expansion material element. The connection element can at least partially be made of metal or plastic. In particular, the connection element can be made of sheet metal and/or designed in the manner of a (flat) sheet metal part. Furthermore, the connection element can be flat and/or disk-shaped. In addition, the connection element can be at least partially S-shaped. The gate valve can be coupled to the expansion material element by the connection element in particular in such a way that a change in length of the expansion material element results in an actuation or adjustment of the gate valve.

The connection element can be fitted onto the gate valve or the expansion material element. For this purpose, the connection element for the gate valve and/or the expansion material element can each have an opening. Furthermore, the connection element can in particular be fitted on or inserted into a first groove of the expansion material element or into a second groove of the gate valve, such that the connection element is in particular connected to the expansion material element or the gate valve in a form-fitting manner. In particular, the first groove of the expansion material element extends around the first longitudinal axis of the expansion material element and/or the second groove of the gate valve extends around the second longitudinal axis of the gate valve. The connection element can be arranged (essentially) without play in the first groove of the expansion material element, in particular in the direction of the first longitudinal axis. The connection element can be arranged (essentially) without play in the second groove of the expansion material element, in particular in the direction of the second longitudinal axis. After the connection element has been fitted on the gate valve or on the expansion material element, the connection element is in an open position. The connection element can then be rotated, in particular about the first longitudinal axis of the expansion material element or the second longitudinal axis of the gate valve, into a closed position. In the closed position, the connection element connects or couples the gate valve and the expansion material element such that the gate valve can be actuated by the expansion material element.

The connection element can be S-shaped.

The connection element can be rotatable between an open position and the closed position.

The gate valve and the expansion material element can be arranged in a body of the thermostatic mixing valve, which has an installation opening for the connection element. The body can be in particular (mainly) cylindrical in shape. Furthermore, the body may be at least partially made of metal and/or plastic. In particular, the body may be a plastic injection-molded part. The installation opening is, in particular, an opening in the body, through which the connection element can be fitted onto the expansion material element or the gate valve when the expansion material element and the gate valve are arranged in the body.

The installation opening may be disposed on a circumferential surface of the body. In particular, the circumferential surface is not an end surface of the body.

The body can be arranged in the faucet body in such a way that the connection element is secured against loosening from the closed position. For this purpose, the body of the thermostatic mixing valve can, for instance, be arranged in a (tubular) body insert of the faucet body. In particular, the faucet body, the body insert, and/or another component of the sanitary faucet may at least partially cover and/or at least partially close the installation opening of the thermostatic mixing valve body when the body is located in the faucet body. This prevents the connection element from rotating from the closed position to the open position.

The connection element can have a thickness of 1 mm (millimeter) to 10 mm. Preferably, the connection element may have a thickness of 3 mm to 6 mm.

A first longitudinal axis of the expansion material element and a second longitudinal axis of the gate valve may extend in parallel to each other. In particular, this can mean that a distance is formed between the first longitudinal axis of the expansion material element and the second longitudinal axis of the gate valve, which distance is in particular orthogonal to the first longitudinal axis and the second longitudinal axis. As a result, the expansion material element and the gate valve, in particular, are disposed adjacently.

The expansion material element can be used to adjust the connection element the against a spring. The spring can, for instance, be designed in the way of a helical spring. In particular, the spring can generate a counterforce, which can be used to return the connection element and thus the gate valve attached to the connection element when the expansion material element shrinks.

In particular, the spring and the gate valve can be arranged non-coaxially to each other. In particular, the spring may have a third longitudinal axis that extends in parallel to the first longitudinal axis of the expansion material element and/or the second longitudinal axis of the gate valve.

The expansion material element may be disposed in a first cavity of a body of the thermostatic mixing valve, and the gate valve may be disposed in a second cavity of the body of the thermostatic mixing valve. In other words, the expansion material element and the gate valve may be spatially separated in the body of the thermostatic mixing valve.

The gate valve may have a hot-water channel for the hot water. Furthermore, the gate valve can in particular be at least partially tubular in shape. Thus, the hot water can be supplied to the warm-water mixing chamber of the thermostatic mixing valve through the gate valve and via the hot-water control gap.

The mixed water may at least partially flow around the expansion material element. For this purpose, the expansion material element can at least partially delimit a mixed-water channel, through which the mixed water mixed by the mixing valve can be routed to the outlet opening of the outlet.

According to a further aspect, a method for installing a sanitary faucet is also proposed, comprising at least the steps listed below:
a) arranging a gate valve and an expansion material element in a body;
b) fitting a connection element to the gate valve or the expansion material element; and
c) rotating the connection element to a closed position, in which the gate valve and the expansion material element are interconnected by the connection element.

The connection element can be rotatable between an open position and the closed position.

In a step d), a cartridge adapter can be arranged in a faucet body such that the connection element is secured against loosening from the closed position.

For further details of the method, please refer to the description the sanitary faucet.

Further, use of a connection element (proposed herein) for establishing a pivotally engaging and/or releasable connection of an adjacently disposed gate valve and expansion material element in a sanitary faucet is also proposed.

The invention and the technical environment are explained in more detail below with reference to the figures. It should be noted that the figures show a particularly preferred embodiment variant of the invention, but the invention is not limited thereto. The same reference numerals are used for the same components in the figures. In an exemplary and schematic manner FIG. 1 shows a sanitary faucet;

FIG. 3 shows a thermostatic mixing valve of the sanitary faucet with a connection element before its installation;

FIG. 4 shows the thermostatic mixing valve of the sanitary faucet with the connection element in an open position;

Figure 2:
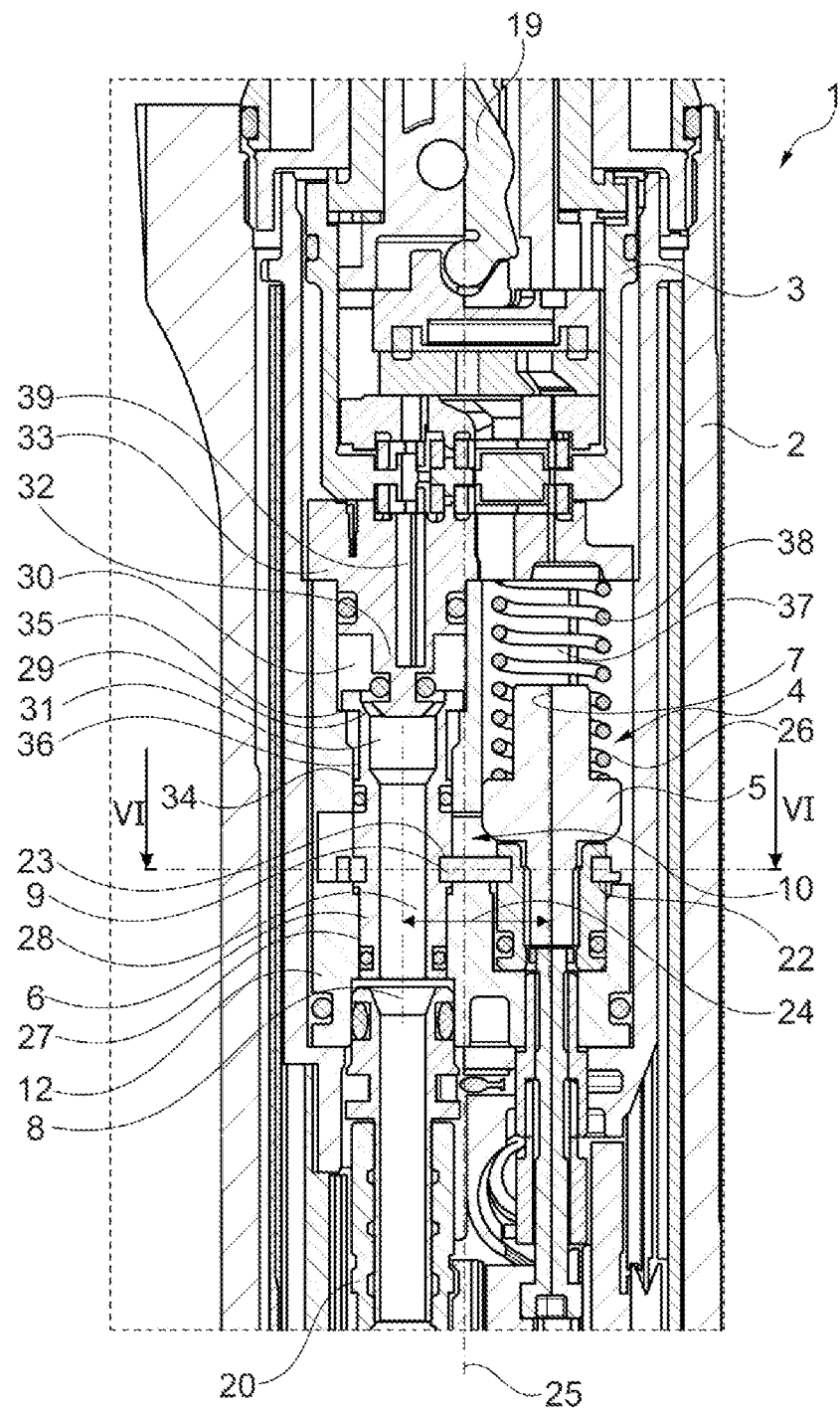
FIG. 2 shows a longitudinal section of the sanitary faucet.

FIG. 1 shows a side view of a first embodiment variant of the sanitary faucet 1. The sanitary faucet 1 comprises a faucet body 2 having an outlet 16 with an outlet opening 17. Further, the sanitary faucet 1 comprises an operating lever 18 that can be swiveled about a horizontal axis to control a discharge amount of a mixed water and rotated about a vertical axis to adjust a mixed-water temperature of the mixed water. For this purpose, the operating lever 18 is connected to a control lever 19 of a mixing valve 3 shown in FIG. 2, which is designed here in the manner of a single-lever mixing cartridge.

FIG. 2 shows a longitudinal section of the sanitary faucet 1 along the line of intersection II-II shown in FIG. 1. A thermostatic mixing valve 4 for mixing cold water and hot water to generate a warm water is arranged in the faucet body 2 of the sanitary faucet 1. The thermostatic mixing valve 4 comprises an expansion material element 5, which is connected to a gate valve 6 via a connection element 9. For this purpose, the connection element 9 engages with a first groove 22 of the expansion material element 5 and with a second groove 23 of the gate valve 6. In FIG. 2 the connection element 9 is therefore in a closed position 10. The expansion material element 5 and the gate valve 6 are not arranged coaxially to each other, but a first longitudinal axis 7 of the expansion material element 5 and a second longitudinal axis 8 of the gate valve 6 extend in parallel and at a distance 24 from each other. Furthermore, the first longitudinal axis 7 and the second longitudinal axis 8 extend in parallel to a longitudinal body axis 25 of the body 12 of the thermostatic mixing valve 4 and the faucet body 2 of the sanitary faucet 1, respectively. The expansion material element 5 is disposed in a first cavity 26 and the gate valve 6 is disposed in a second cavity 27 of the body 12. A hot water line 20, which can be used to supply hot water to the thermostatic mixing valve 4, opens into the body 12. A hot-water channel 28 extends through the gate valve 6, such that the gate valve 6 is tubular. The hot water can be routed through the hot water channel 28 and through a hot water control gap 29 into a warm-water mixing chamber 30 of the thermostatic mixing valve 4. The hot water control gap 29 is formed between an inner surface 31 of the gate valve 6 and a pin 32 of a cartridge adapter 33 of the mixing valve 3.

Furthermore, a cold-water line 21 shown in FIG. 1 opens into the body 12. The cold water can be routed to the mixing valve 3 and an annular gap 34 extending around the gate valve 6 via cold water lines in the body 12 that are not visible in FIG. 2. Cold water can be supplied to the warm-water mixing chamber 30 through a cold-water control gap 35. The cold-water control gap 35 is formed between an outer surface 36 of the gate valve 6 and the body 12 of the thermostatic mixing valve 4.

The expansion material element 5 delimits a mixed water channel 37, via which a mixed water mixed by the mixing valve 3 can be supplied to the outlet opening 17 shown in FIG. 1. Therefore, during operation of the sanitary faucet 1, the expansion material element 5 expands in response to a mixed-water temperature of the mixed water, in that way adjusting the gate valve 6 in parallel to the second longitudinal axis 8 of the gate valve 6 via the connection element 9 resulting in a gap width of the hot water control gap 29 and a gap width of the cold-water control gap 35 changing. If the mixed-water temperature of the mixed water increases, the expansion material element 5 adjusts the gate valve 6 such that the gap width of the hot water control gap 29 is reduced and the gap width of the cold-water control gap 35 is increased. If the mixed-water temperature of the mixed water decreases, the expansion material element 5 adjusts the gate valve 6 such that the gap width of the hot water control gap 29 is increased and the gap width of the cold-water control gap 35 is reduced. For this purpose, the expansion material element 5 is preloaded by a spring 38, which is designed here in the manner of a helical spring and is arranged in the mixed-water channel 37. The warm water mixed by the thermostatic mixing valve 4 in the warm-water mixing chamber 30 can be supplied to the mixing valve 3 via a warm-water channel 39, which is only partially visible here and can be mixed with the cold water to form the mixed water.

FIG. 3 shows the thermostatic mixing valve 4 of the sanitary faucet 1 shown in FIG. 2 with the connection element 9 prior to its installation. The body 12 of the thermostatic mixing valve 4 is largely cylindrical in shape and extends along the longitudinal axis 25 of the body. The connection element 9 is S-shaped and has a first opening 40 and a second opening 41. Furthermore, the connection element 9 has a thickness 15. To connect the expansion material element 5 to the gate valve 6, the first opening 40 of the connection element 9 can be fitted onto the second groove 23 of the gate valve 6 through an installation opening 13 of the thermostatic mixing valve 4 formed in a circumferential surface 14 of the body 12.

FIG. 4 shows the thermostatic mixing valve 4 with the connection element 9 after the connection element 9 has been inserted into the second groove 23 of the gate valve 6 with the first opening 40 shown in FIG. 3. In FIG. 4 the connection element 9 is in an open position 11. In the open position 11, the connection element 9 can be rotated about the second longitudinal axis 8 of the gate valve 6 shown in FIG. 2 until the connection element 9 engages with its second opening 41 in the first groove 22 of the expansion material element 5.

Figure 5:
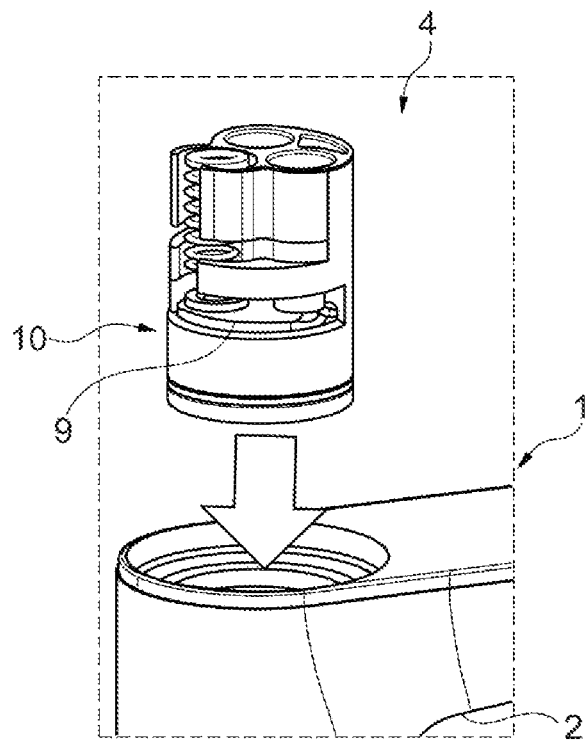
FIG. 5 shows the thermostatic mixing valve prior to installation in a faucet body of the sanitary faucet.

FIG. 5 shows the thermostatic mixing valve 4 before it is installed in the faucet body 2 of the sanitary faucet 1. In FIG. 5, the connection element 9 is in the closed position 10.

Figure 6:
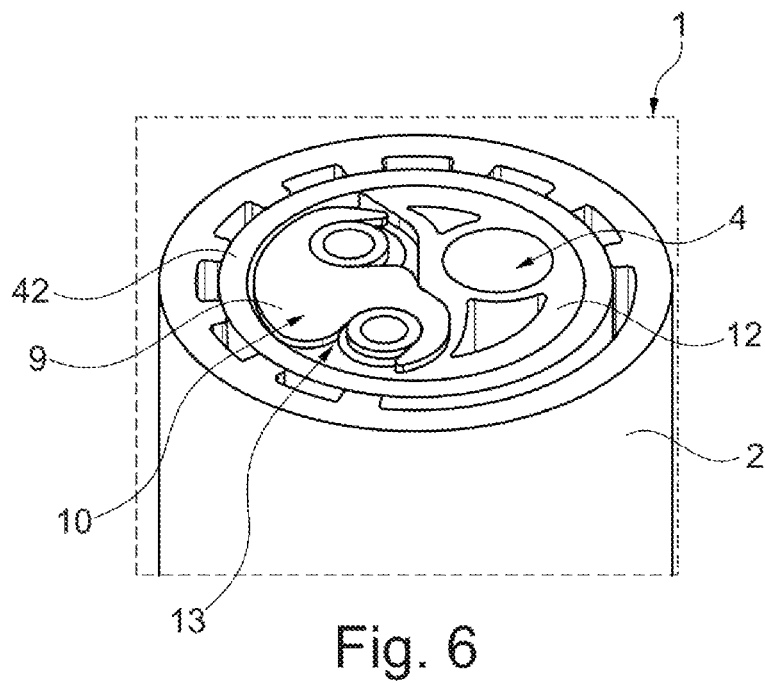
FIG. 6 shows a sectional view of the sanitary faucet.

FIG. 6 shows a sectional representation of the sanitary faucet 1 along the line of intersection VI-VI shown in FIG. 2. In FIG. 6, the body 12 of the thermostatic mixing valve 4 is arranged in the faucet body 2 such that the installation opening 13 is covered by a tubular body insert 42. In this way, the connection element 9 is secured against loosening from the closed position 10.

In particular, this invention permits a thermostatic mixing valve of a sanitary faucet to be designed having a small installation space requirement.

LIST OF REFERENCE NUMERALS 1 sanitary faucet
2 faucet body
3 mixing valve
4 thermostatic mixing valve
5 expansion material element
6 gate valve
7 first longitudinal axis
8 second longitudinal axis
9 connection element
10 closed position
11 open position
12 body
13 installation opening
14 circumferential surface
15 thickness
16 outlet
17 outlet opening
18 operating lever
19 control lever
20 hot water pipe
21 cold-water line
22 first groove
23 second groove
24 distance
25 longitudinal axis of body
26 first cavity
27 second cavity
28 hot-water channel
29 hot-water control gap
30 warm-water mixing chamber
31 inner surface
32 pin
33 cartridge adapter
34 annular gap
35 cold-water regulating gap
36 Outer surface
37 Mixed-water channel
38 Spring
39 warm-water channel
40 first opening
41 second opening
42 body insert

The invention claimed is:

1. A sanitary faucet (1) comprising:
a faucet body (2);
a mixing valve (3) for mixing cold water and warm water to form a mixed water; and
a thermostatic mixing valve (4) for mixing cold water and hot water to generate the warm water, comprising an expansion material element (5) and a gate valve (6) that can be operated by the expansion material element (5) for adjusting a mixing ratio between the cold water and the hot water, wherein the expansion material element (5) and the gate valve (6) are arranged non-coaxially to each other, wherein the expansion material element (5) can be used to operate the gate valve (6) via a connection element (9), and wherein the connection element (9) can be attached to the gate valve (6) or the expansion material element (5) and can subsequently be rotated into a closed position (10), in which the gate valve (6) and the expansion material element (5) are interconnected by the connection element (9).

2. The sanitary faucet (1) according to claim 1, wherein the connection element (9) is S-shaped.

3. The sanitary faucet (1) according to claim 1, wherein the connection element (9) can be rotatable between an open position (11) and the closed position (10).

4. The sanitary faucet (1) according to claim 1, wherein the gate valve (6) and the expansion material element (5) are arranged in a body (12) of the thermostatic mixing valve (4), which has an installation opening (13) for the connection element (9).

5. The sanitary faucet (1) according to claim 4, wherein the installation opening (13) is formed in a circumferential surface (14) of the body (12).

6. The sanitary faucet (1) according to claim 4, wherein the body (12) is arranged in the faucet body (2) such that the connection element (9) is secured against loosening from the closed position (10).

7. The sanitary faucet (1) according to claim 1, wherein the connection element (9) has a thickness (15) of 1 mm to 10 mm.

8. A method for installing a sanitary faucet (1); comprising at least the steps outlined below:
   a) arranging a gate valve (6) and an expansion material element (5) in a body (12);
   b) attaching a connection element (9) to the gate valve (6) or the expansion material element (5); and
   c) rotating the connection element (9) to a closed position (10), in which the gate valve (6) and the expansion material element (5) are interconnected by the connection element (9).

9. The method according to claim 8, wherein the connection element (9) can be rotated between an open position (11) and the closed position (10).

10. The method according to claim 8, wherein in a step d) the body (12) is arranged in a faucet body (2) such that the connection element (9) is secured against loosening from the closed position (10).

* * * * *